(12) United States Patent
Layher et al.

(10) Patent No.: US 7,621,176 B2
(45) Date of Patent: Nov. 24, 2009

(54) METHOD FOR DETERMINING THE CRANKSHAFT POSITION OF A ROTATING CRANKSHAFT OF AN INTERNAL COMBUSTION ENGINE

(75) Inventors: Wolfgang Layher, Besigheim (DE); Georg Maier, Stetten (DE); Christine Halle, Ebersbach/Fils (DE); Arno Kinnen, Fellbach (DE); Uwe Theimer, Frickenhausen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 45 days.

(21) Appl. No.: 11/838,233

(22) Filed: Aug. 14, 2007

(65) Prior Publication Data
US 2008/0041144 A1  Feb. 21, 2008

(30) Foreign Application Priority Data
Aug. 16, 2006 (DE) ........................ 10 2006 038 281

(51) Int. Cl.
*G01L 3/26* (2006.01)
(52) U.S. Cl. .................................................. 73/115.01
(58) Field of Classification Search .............. 73/114.26, 73/115.01; 123/406.58, 618
See application file for complete search history.

(56) References Cited

U.S. PATENT DOCUMENTS 5,284,118 A * 2/1994 Kato et al. ................. 123/478
5,586,524 A * 12/1996 Nonaka et al. ............. 123/73 A
6,560,526 B1 * 5/2003 Matekunas et al. .......... 701/104
6,598,469 B2 * 7/2003 Shimoyama et al. ...... 73/114.24
6,935,168 B2 * 8/2005 Shimoyama .............. 73/114.28
6,955,081 B2 * 10/2005 Schwulst .................. 73/114.26
7,079,936 B2 * 7/2006 Honda ........................ 701/102
7,111,613 B1 * 9/2006 Barnes et al. ................ 123/467
7,302,835 B2 * 12/2007 Galtier et al. ............. 73/114.31
2003/0111024 A1 * 6/2003 Venturoli et al. .......... 123/41 E
2008/0042643 A1 * 2/2008 Maier et al. ................. 324/166
2008/0053407 A1 * 3/2008 Maier et al. ............. 123/406.58

* cited by examiner

*Primary Examiner*—Lisa M Caputo
*Assistant Examiner*—Freddie Kirkland, III
(74) *Attorney, Agent, or Firm*—Gudrun E. Huckett

(57) ABSTRACT

The absolute crankshaft angle of an internal combustion engine of a hand-held power tool is to be determined. The engine has a cylinder with a combustion chamber delimited by a piston that drives a crankshaft in a crankcase. The crankcase is connected by a transfer passage to the combustion chamber and the transfer port of the transfer passage is piston-controlled. Ignition takes place at an adjusted crankshaft angle. The energy supply unit of the engine is driven by the crankshaft and provides electric energy for ignition. The crankshaft angle is determined in that a signal generator is provided as an energy supply unit and generates an alternating voltage signal caused by a crankshaft revolution. An operating pressure signal of the engine is detected by a pressure sensor. The output signals of the pressure sensor and of the signal generator are linked with one another for determining the absolute crankshaft angle.

10 Claims, 2 Drawing Sheets

METHOD FOR DETERMINING THE CRANKSHAFT POSITION OF A ROTATING CRANKSHAFT OF AN INTERNAL COMBUSTION ENGINE

BACKGROUND OF THE INVENTION

The invention relates to a method for absolute crankshaft angle determination of a rotating crankshaft of an internal combustion engine of a hand-held power tool, in particular, a portable hand-held power tool such as a motor chain saw, a cut-off machine, a trimmer, a blower, or the like. The internal combustion engine has a cylinder with a combustion chamber that is delimited by a piston driving a crankshaft. The crankshaft housing of the internal combustion engine is connected to the combustion chamber by at least one transfer passage whose transfer port opening into the combustion chamber is controlled by the piston. An ignition control unit is provided that triggers at the appropriate crankshaft angle an ignition spark at a spark plug correlated with the combustion chamber. An energy supply unit that is driven by the crankshaft for supplying electric energy for ignition is also provided.

The ignition device of an internal combustion engine in hand-held portable power tools has usually an induction coil that is arranged near magnets rotating with the crankshaft. For each revolution, voltage is generated in the induction coil. This voltage signal is approximately sine-shaped and has ideally three zero crossings. The voltage signal serves for electrically supplying the ignition device and provides the electric energy that is required for triggering the spark in a spark plug.

In order to determine the rotary position of the crankshaft, the precise mounting location of the induction coil as well as the rotational position of the revolving magnets relative to the crankshaft must be known. For example, if the fan wheel that supports the magnets is mounted on the crankshaft at an angular displacement, the generator signal will exhibit a matching angular displacement and this causes errors in the ignition timing. This error can be minimized by manual displacement of the induction coil. However, this requires appropriate adjusting labor; this is a complex task. Moreover, the occurring errors cannot be compensated always by positional changes of the induction coil because there is only limited space available about the circumference of the fan wheel for the induction coil.

SUMMARY OF THE INVENTION

It is an object of the present invention to provide a method for absolute crankshaft angle determination of a rotating crankshaft of an internal combustion engine which method should be simple and safe.

In accordance with the present invention, this is achieved in that as an energy supply unit a signal generator is provided, in that the signal generator generates an alternating voltage signal caused by crankshaft revolution, in that an operating pressure signal of the internal combustion engine is detected by a pressure sensor, and in that for determination of the absolute crankshaft angle the output signal of the pressure sensor and the output signal of the signal generator are linked with one another.

In order to synchronize the voltage signal of the generator provided as an energy supply unit with the rotational position of the crankshaft, an operating pressure signal of the internal combustion engine is measured by a pressure sensor. For determining the absolute crankshaft angle, the output signal of the pressure sensor and the output signal of the signal generator are linked with one another in such a way that the generator signal is synchronized.

Advantageously, the crankcase pressure measured in the crankcase is selected as the operating pressure signal. Other operating pressure signals can also be expediently utilized, for example, the pressure in the intake passage.

Preferably, a significant feature of the pressure sensor signal is correlated with a known angle position of the crankshaft in order to assign, at the time the significant feature occurs within the pressure sensor signal, this known crankshaft angle to the generator signal as the absolute crankshaft angle.

The voltage signal of the signal generator is designed such that it exhibits sequential zero crossings. After the absolute crankshaft angle has been assigned to the generator signal, the subsequent and all further zero crossings of the generator signal are synchronized with the actual mechanical angle position of the crankshaft.

The pressure signal of the crankcase is a signal that is characteristic for each internal combustion engine; this pressure signal is essentially independent of construction tolerances or mounting tolerances. When the piston is moving upwardly, an underpressure results in the crankcase that is used for taking in a fuel/air mixture. As the piston moves downwardly, the taken-in fuel/air mixture is compressed within the crankcase. The pressure increases. This pressure increase continues until the piston opens the transfer port into the combustion chamber. At this point in time, the compressed mixture flows from the crankcase through the transfer passages and the transfer ports into the combustion chamber so that the pressure in the crankcase will drop again. The pressure course in the crankcase not only has a characteristic maximum; at the point in time when the transfer ports open, a significant pressure drop can be determined in the curve. Opening of the transfer ports is a constructively set control time that is independent of the position of the induction coil or of the correlated magnets. The pressure course that is typical for an internal combustion engine is determined once, saved, and written into a storage means for retrieval by an evaluation device.

When the pressure course in the crankcase is determined and evaluated, a significant feature of the pressure curve correlated with the crankshaft angle can be easily recognized in order to then assign—once this significant feature occurs—the known angle position of the crankshaft to the generator signal as a fixed value. The generator signal is synchronized with the angle position of the crankshaft, independent of which local positional displacement the induction coil or the magnet has relative to the rotational position of the crankshaft.

In a preferred embodiment of the invention, the signal generator is designed such that it generates a continuous alternating signal for each revolution of the crankshaft. After synchronization of the alternating signal, the absolute crankshaft angle can be determined at any point in time of the crankshaft revolution simply based on the zero crossings of the generator signal. For this purpose, the signal generator is designed such that the period duration T of the generator signal corresponds to the n-th part of a crankshaft revolution wherein n is a preferably an integer greater than 2. Preferably, the integer n is maximally 12 and advantageously selected to be within the range from 4 to 8, in particular from 5 to 7. In the illustrated embodiment, n is selected to be 6.

DESCRIPTION OF THE PREFERRED EMBODIMENTS

Figure 1:
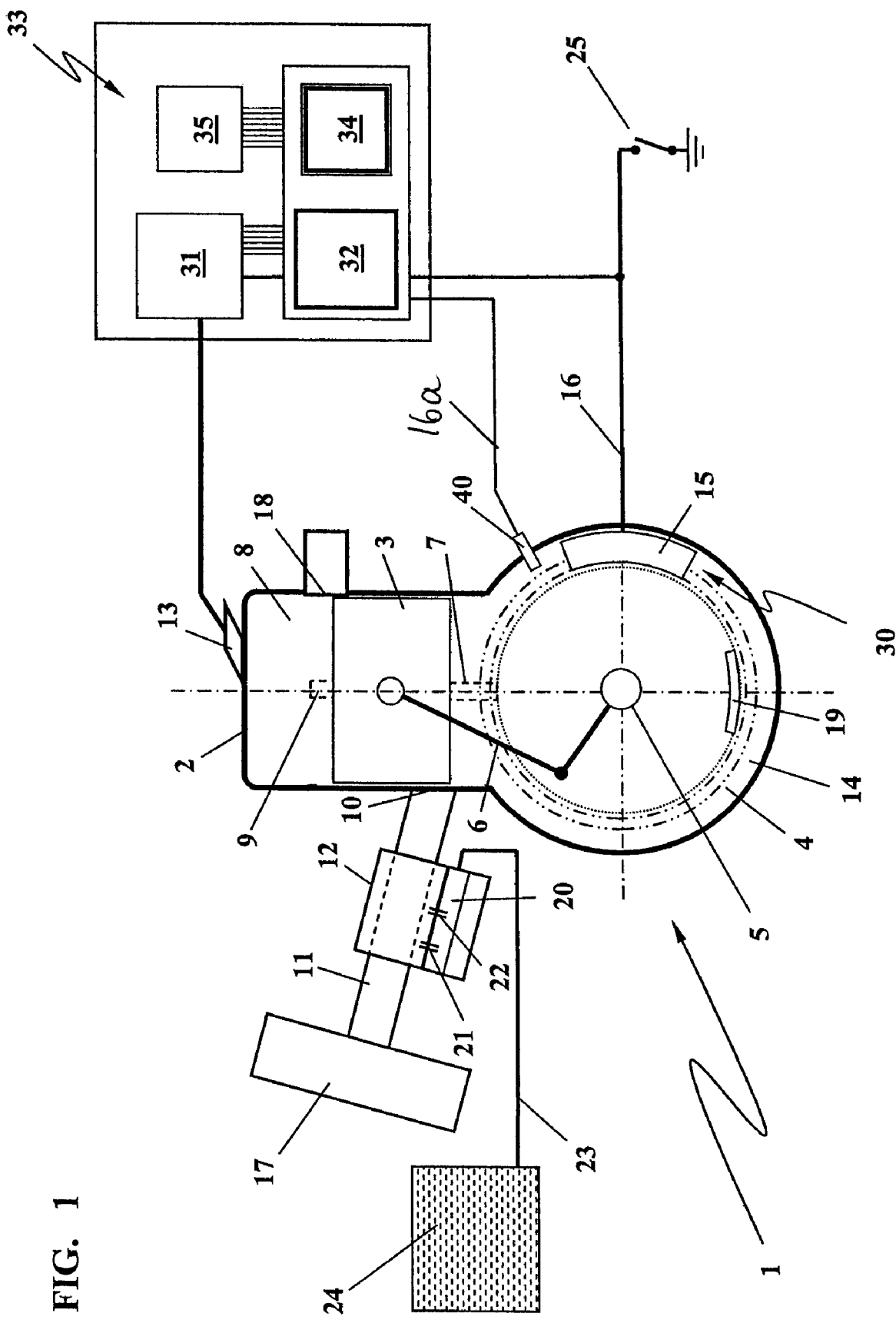
FIG. 1 is a schematic illustration of an internal combustion engine with ignition control unit and an evaluation device.

The internal combustion engine 1 illustrated in FIG. 1 is preferably a single-cylinder engine, in particular a single-cylinder two-stroke engine. The internal combustion engine 1 illustrated schematically has a displacement of expediently more than 20 cc and less than 250 cc, in particular less than 150 cc. The internal combustion engine 1 is embodied as a two-stroke engine with scavenging air for improving the exhaust gas quality.

The internal combustion engine 1 has a cylinder 2 with a piston 3 reciprocatingly arranged therein and driving in rotation a crankshaft 5 supported in crankcase 4. For this purpose, the crankshaft 5 is connected by a connecting rod 6 to the piston 3.

In the illustrated embodiment, the piston 3 controls a mixture intake 10 that takes in combustion air via intake passage 11 and air filter 17 when underpressure is present in crankcase 4. Fuel is admixed to the combustion air as it passes through the carburetor 12. By means of the mixture intake 10 controlled by the piston 3 a fuel/air mixture is transferred into the crankcase 4 and, as the piston 3 moves downwardly, is compressed and conveyed through the transfer passages 7 formed within the cylinder 2 into the combustion chamber 8. The transfer passages open with transfer ports 9 into the combustion chamber 8 wherein the transfer ports 9 are controlled by the piston 3. As the piston moves downwardly, the pressure in the crankcase 4 will increase—as long as the transfer ports 9 are closed—until the piston 3 releases a transfer port 9 so that the taken-in fuel/air mixture passes through transfer passage 7 and transfer port 9 into the combustion chamber 8. At the same time, the pressure in the crankcase 4 drops.

The fuel/air mixture which has been compressed in the combustion chamber 8 by the upwardly moving piston 3 is ignited by a spark generated by a spark plug 13 so that the piston 3 is forced downwardly and the crankshaft 5 is driven by connecting rod 6. The exhaust gases resulting from the combustion process are removed through a preferably piston-controlled exhaust port 18.

The carburetor 12 in the illustrated embodiment is a diaphragm carburetor whose diaphragm-controlled control chamber 20 is supplied through fuel line 23 with fuel stored in the fuel tank 24. The fuel passes from the diaphragm-controlled control chamber 20 through a main jet 21 or an idle jet 22 into the intake passage of the carburetor 12.

A wheel 14, indicated in dashed lines, is connected to the crankshaft 5; the wheel 14 can be a flywheel, a fan wheel, or a similar rotating part. A magnet 19 is arranged in the wheel 14 and induces a voltage in an induction coil 15 arranged fixedly on the crankcase circumferentially relative to the wheel 14. The magnet 19 and the induction coil 15 together form a signal generator 30 that is embodied as an energy supply unit and provides the electrical energy for the ignition. The output signal of the induction coil 15 is supplied by means of electrical signal line 16 to an ignition control unit 31 that is part of the central control unit 33. The signal generator 30 comprised of the revolving magnet 19 and the induction coil 15 not only supplies the ignition energy for the ignition sparks of the spark plug 13 but also the required electrical energy for the ignition control unit 31 itself as well as for the central control unit 33.

By means of a short-circuit switch 25, the signal line 16 can be connected to ground so that no electrical energy is available. The central control unit 33 is not energized; and the motor stops.

The central control unit 33 comprises moreover a common evaluation device 32 to which can be supplied, in addition to the output signal of the signal generator 30, the output signal of a pressure sensor 40 that detects the operating pressure signal of the internal combustion engine. This operating pressure signal can be the intake pressure, the crankcase pressure or an appropriate fluctuating operating pressure. In the illustrated embodiment, the pressure is detected in the crankcase 4 and converted into a corresponding electric signal.

When a pressure sensor 40 is used that is provided in the housing of the pressure sensor with an electronic device for pre-conditioning the sensor output signal, processing of the sensor signal in the common evaluation unit 32 is obsolete. The pre-conditioned sensor signal can be processed directly, for example, in the central control unit 33.

The term pre-conditioning is to be understood as signal processing that facilitates further processing of the sensor signal. For example, a temperature compensation can be realized and/or a standardization of the output signal to, for example, 0 to 5 Volt can be done. A further conditioning is possible in that a pressure sensor signal is provided only when a characteristic pressure signal is detected that indicates a certain mechanical angle position of the crankshaft.

The central control unit 33 comprises a microprocessor 34 which performs tasks of the evaluation unit 32 as well as calculations for the ignition control unit 31 for determining adjusted ignition timing as a function of the operating parameters of the internal combustion engine 1. As a main memory the memory 35 is provided wherein the memory 35 can be used as the main memory of the microprocessor 34 as well as a memory for operating data. It is also possible to divide the memory 35 into a main memory and a memory for operating data.

Figure 2:
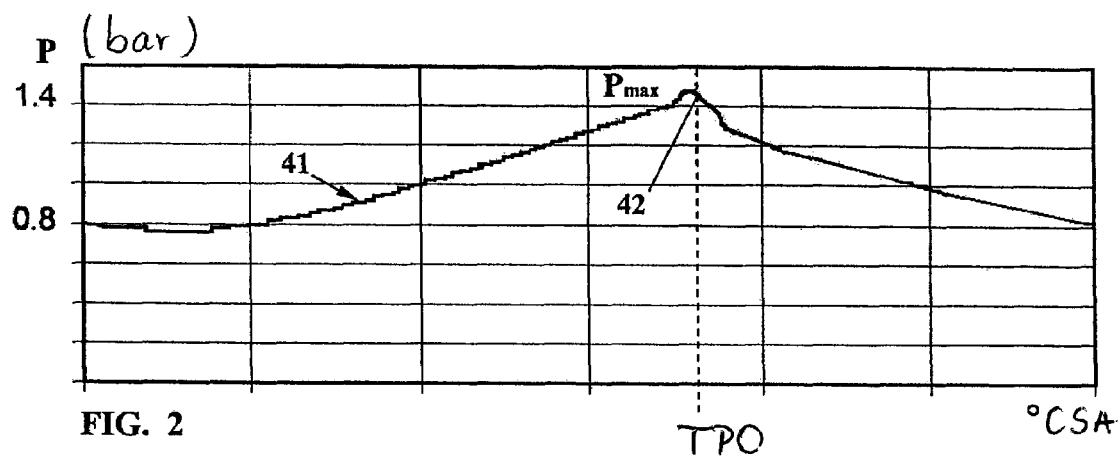
FIG. 2 shows the course of the crankcase pressure plotted versus the crankshaft angle.

During operation of the internal combustion engine 1 the pressure in the crankcase 4 is continuously detected by the pressure sensor 40 and is supplied as an electric signal to the central control unit 33. The pressure in the crankcase plotted against the crankshaft angle is illustrated in FIG. 2 in a simplified way. This illustrates that the crankcase pressure P fluctuates between a value of 0.8 bar and a peak value of approximately 1.5 bar. In this connection, the crankcase pressure rises once up to the pressure maximum $P_{max}$ for one crankshaft revolution.

Figure 3:
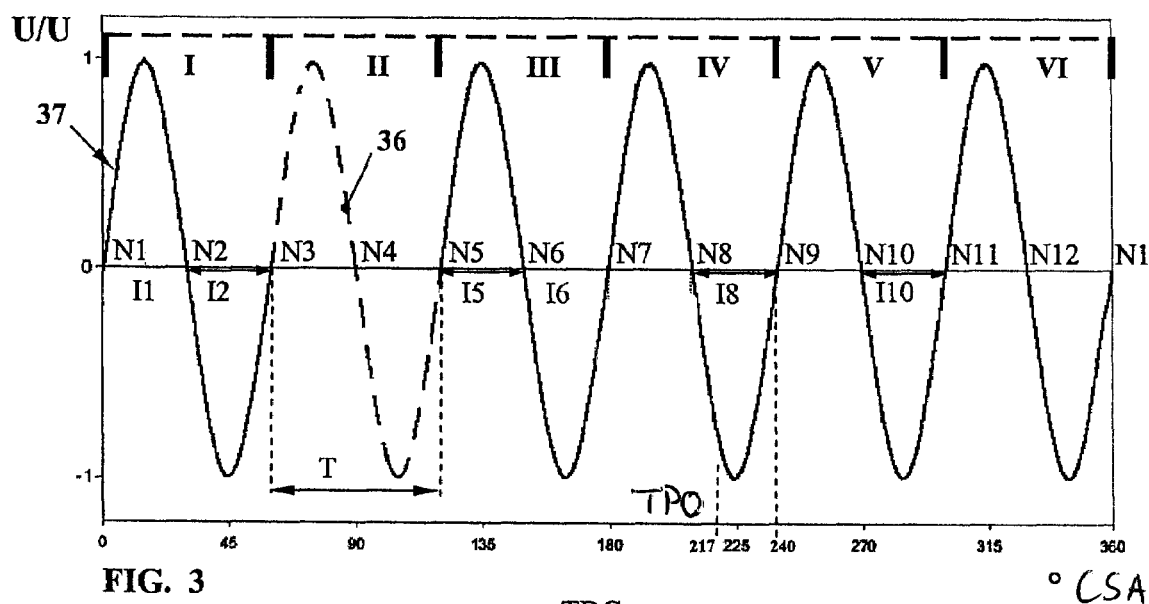
FIG. 3 shows the signal sequence of the signal generator plotted versus the crankshaft revolution.

In the embodiment according to FIG. 1, a signal generator 30 comprised of an induction coil 15 and a revolving magnet 19 is illustrated; such a signal generator would produce an approximately sine-shaped half wave per revolution. Such a half wave 36 is schematically illustrated in dashed lines in FIG. 3. The generator signal 36 has a period duration T that corresponds to a partial angle of the crankshaft revolution. In the illustrated embodiment, the generator signal 36 has three zero crossings N3, N4, and N5.

In a preferred embodiment of the invention, the signal generator 30 is designed such (illustrated in dashed lines) that by means of a crankshaft revolution of 360 degrees a continuous alternating voltage signal 37 results. In this connection the voltage signal 37 generated by the signal generator 30 is designed such that its period duration T corresponds to the n-th part of a crankshaft revolution wherein n is preferably an integer. The integer n is greater than 2 and maximally 12.

Figure 4:
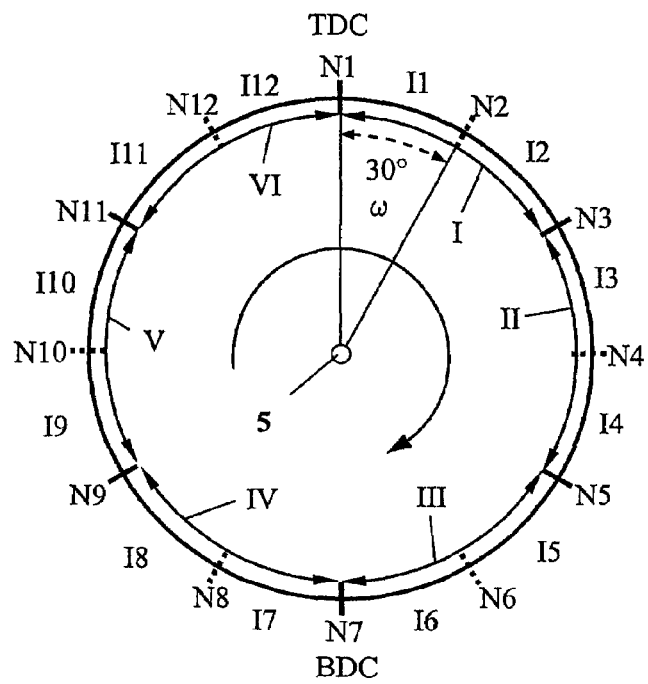
FIG. 4 is a schematic illustration of the position of the voltage signal relative to the crankshaft revolution.

Advantageously, the number n is within the range from 4 to 8, in particular from 5 to 7. In the illustrated embodiment, the number n is equal to 6. This provides six intervals I to VI (FIGS. 3, 4) wherein each interval has three zero crossings N1, N2, N3, . . . N12 correlated therewith. The rotary angle spacing I1, I2 to I12 of the zero crossings N1, N2, . . . N12 corresponds in this division to precisely a crankshaft angle of 30 degrees. This is illustrated in FIG. 4 with the aid of a circular diagram. The correlation is selected such that the zero crossing N1 corresponds to top dead center (TDC) and the zero crossing N7 corresponds to bottom dead center (BDC).

By means of such a generator signal 37 the rotational position (angle position) of the crankshaft can be correlated in 30 degree steps as soon as the first actual value of the crankshaft position can be assigned.

For this purpose, the generator signal 37, through the signal line 16, as well as the pressure sensor signal 41 of the pressure sensor 40, through signal line 16a, are supplied to the evaluation unit 32. The pressure sensor signal 41 is monitored with respect to a significant feature 42 wherein the significant feature of the pressure sensor signal 41 is assigned to a known angle position (rotary position) of the crankshaft 5. Such a significant feature 42 can be the pressure drop of the crankcase pressure at the point in time of opening the transfer port 9. In FIG. 2, this significant feature 42 is illustrated in the angle position of the crankshaft TPO (transfer port open). When the significant feature 42 occurs, the evaluation unit 32 retrieves from the memory 35 where the pressure course of the crankcase pressure is saved the correlated value of the angle position of the crankshaft (in the embodiment approximately 217 degrees) and assigns this retrieved angle value at the point in time of occurrence of the significant feature to the generator signal 37 as the absolute crankshaft angle. By means of the evaluation unit 32, it is now possible to assign at the next zero crossing the crankshaft angle (CSA) of 240 degrees as the interval angle value. In this way, the generator signal 37 is synchronized to the actual rotational position of the crankshaft 5. No other signals for control of the motor are needed. Simply the voltage signal 37 of the signal generator 30 is now sufficient to determine precisely—in 30 degree steps—the actual angle position of the crankshaft. The generator signal 37 is "locked" in the exact position. The crankshaft angle between two zero crossings can be calculated with satisfactory precision by iterative methods as a function of the actual engine speed.

The specification incorporates by reference the entire disclosure of German priority document 10 2006 038 281.1 having a filing date of 16 Aug. 2006.

While specific embodiments of the invention have been shown and described in detail to illustrate the inventive principles, it will be understood that the invention may be embodied otherwise without departing from such principles.

What is claimed is:

1. A method for absolute crankshaft angle determination of a revolving crankshaft of a two-stroke engine of a hand-held power tool, wherein the two-stroke engine has a single cylinder with a combustion chamber that is delimited by a piston and is provided with a spark plug, wherein the two-stoke engine has a crankcase with a crankshaft rotatably supported in the crankcase and driven by the piston, wherein the crankcase is connected by at least one transfer passage to the combustion chamber, wherein the at least one transfer passage has a transfer port that is controlled by the piston, and wherein the two-stroke engine comprises an ignition control unit triggering a spark at the spark plug when an adjusted crankshaft angle is reached, and wherein the two-stroke engine comprises an energy supply unit driven by the crankshaft for providing electric energy for ignition, the method comprising the steps of:

providing a signal generator as an energy supply unit;

generating an alternating voltage signal with the signal generator which voltage signal is caused by a crankshaft revolution, wherein the voltage signal of the signal generator has sequential zero crossings;

detecting an operating pressure signal of the two-stroke engine by a pressure sensor;

correlating a significant feature of the output signal of the pressure sensor to a known angle position of the crankshaft, wherein the significant feature occurs once for each revolution of the crankshaft;

linking an output signal of the pressure sensor and an output signal of the signal generator with one another for determining an absolute crankshaft angle such that;

when the significant feature in the output signal of the pressure sensor occurs, a crankshaft angle of the known angle position is assigned as the absolute crankshaft angle to the voltage signal, wherein a periodic duration of the voltage signal matches an n-th part of a crankshaft revolution wherein n is an integer greater than 2;

wherein, after assigning the absolute crankshaft angle to the voltage signal, a subsequent zero crossing of the voltage signal is synchronized with the crankshaft angle;

wherein, after synchronization, the absolute crankshaft angle of the crankshaft at any point in time of a crankshaft revolution can be determined based on the zero crossings of the voltage signal.

2. The method according to claim 1, wherein the operating pressure signal of the two-stroke engine is a crankcase pressure in the crankcase.

3. The method according to claim 1, wherein the significant feature of the output signal of the pressure sensor is a pressure maximum of a pressure curve of the crankcase pressure.

4. The method according to claim 1, wherein the significant feature of the output signal of the pressure sensor is a pressure drop of a crankcase pressure at a point in time of opening the transfer port.

5. The method according to claim 1, wherein the voltage signal generated by the signal generator is a continuous signal.

6. The method according to claim 1, wherein the integer n is maximally 8.

7. The method according to claim 6, wherein the integer n is preferably in the range from 4 to 8.

8. The method according to claim 6, wherein the integer n is preferably from 5 to 7.

9. The method according to claim 1, wherein the two-stroke engine has a displacement of between 20 cc and 250 cc.

10. The method according to claim 1, wherein the two-stroke engine has a displacement of less than 150 cc.

* * * * *